(12) United States Patent
Vogel

(10) Patent No.: US 12,357,122 B2
(45) Date of Patent: Jul. 15, 2025

(54) PORTABLE GRILL ROTISSERIE SYSTEM

(71) Applicant: Matthew Vogel, Arlington, VA (US)

(72) Inventor: Matthew Vogel, Arlington, VA (US)

( * ) Notice: Subject to any disclaimer, the term of this patent is extended or adjusted under 35 U.S.C. 154(b) by 53 days.

(21) Appl. No.: 18/932,729

(22) Filed: Oct. 31, 2024

(65) Prior Publication Data

US 2025/0134301 A1 May 1, 2025

Related U.S. Application Data

(60) Provisional application No. 63/594,508, filed on Oct. 31, 2023.

(51) Int. Cl.
*A47J 37/04* (2006.01)
*A47J 36/32* (2006.01)
*A47J 37/07* (2006.01)

(52) U.S. Cl.
CPC ........... *A47J 37/041* (2013.01); *A47J 36/321* (2018.08); *A47J 37/0763* (2013.01)

(58) Field of Classification Search
CPC ........ A47J 37/04; A47J 37/041; A47J 37/042; A47J 37/048; A47J 37/049; A47J 37/07; A47J 37/0763; A47J 37/0786; A47J 37/0694; A47J 36/321
See application file for complete search history.

(56) References Cited

U.S. PATENT DOCUMENTS

| 5,117,748 | A | | 6/1992 | Costa | |
|---|---|---|---|---|---|
| 2003/0010218 | A1 | | 1/2003 | Evans et al. | |
| 2007/0283822 | A1 | * | 12/2007 | Sheridan | A47J 37/048 99/441 |
| 2012/0103319 | A1 | * | 5/2012 | Sheridan | F23H 17/02 126/181 |
| 2012/0285338 | A1 | * | 11/2012 | Anderson, Sr. | A47J 37/048 99/441 |
| 2021/0030204 | A1 | * | 2/2021 | Golway | A47J 37/041 |

FOREIGN PATENT DOCUMENTS

| CN | 2812787 Y | * | 9/2006 | | |
|---|---|---|---|---|---|
| DE | 202005011477 U1 | * | 11/2005 | | A47J 37/048 |

* cited by examiner

*Primary Examiner* — Hung D Nguyen
(74) *Attorney, Agent, or Firm* — Stanzione & Associates, PLLC; Patrick Stanzione

(57) ABSTRACT

A portable rotisserie grill system that includes a roller assembly and a separate heat-resistant metal box. The heat-resistant metal box including ceramic insulation therein, a rotation motor to rotate rollers of the rotation assembly via a motor coupler, cooling fans, a digital temperature controller micro circuit board to control the cooling fans, a battery compartment to provide energy to the motor, the digital temperature controller micro circuit board and the cooling fans, and a Bluetooth chip to provide wireless control of each of the internal components within the heat-resistant metal box.

14 Claims, 9 Drawing Sheets

PORTABLE GRILL ROTISSERIE SYSTEM

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71 (d).

CROSS-REFERENCE TO RELATED APPLICATIONS

The present application is a non-provisional patent application claiming priority to U.S. Provisional Patent Application Ser. No. 63/594,508 filed on Oct. 31, 2023, entitled PORTABLE GRILL ROTISSERIE, the full disclosure which is hereby incorporated by reference in its entirety.

BACKGROUND OF THE INVENTIVE CONCEPT

1. Field of the Invention

The present inventive concept relates to a portable grill rotisserie system. More particularly, but not exclusively, this inventive concept relates to a portable rotisserie grill system configured to be placed on a hot grill or directly over flames to rotate different foods over the grill or flame.

Description of the Related Art

Rotating food while applying heat is a common way to cook food evenly to avoid overcooking one side of the food while another side of the food is undercooked. Some common devices to rotate food while applying heat thereto include a hotdog rotisserie, where rollers are disposed in a heated glass box to rotate food. However, due to the heat within the box the electrical parts are disposed outside the box to avoid burning and destroying the electrical parts, including any electrical wires, resistors, etc.

Another type of rotisserie for rotating food while the food is cooked is a multi-tier rotary grill. US 2003/0010218 by Evans et al. discloses a multi-tier rotary grill for grilling and heating food items such as hot dogs, sausages, and similar foods. However, this device is limited to heating up rollers with an electrical heating rod or electrical element 38 mounted within each roller 22. This system is limited to applying an electric heat to the food, and therefore requires an electrical outlet to heat and rotate the food items. Further, electrical heating via heated rollers cannot provide the grilling taste experience that can only be achieved via a grill or natural flames.

U.S. Pat. No. 5,117,748 by Costa discloses a rotary grilling assembly 10 that includes frame members 12 and 14 with a plurality of rollers 16a-16g disposed therebetween in which food items can be placed on. Although this rotary grilling assembly 10 can be placed over a grill it must be moved over the grill by a handle 20 for shifting the frame members 12 and 14 across a supporting grill. This setup requires constant attention to and constant shifting of the rotary grilling assembly 10 over the supporting grill to avoid burning one side of the food items. Further, the handle 20 will get hot over time, causing it to be difficult to constantly hold the handle 20 to shift the food over the supporting grill.

AU 2001100378 A4 by Chin discloses a sausage rotisserie consisting of a flat mild steel rigid frame with five stainless steel rollers rotating within the frame. With this rotisserie a drive motor 3 rotates an output shaft 8, which rotates a sprocket 7 to turn a chain 1 that rotates the rollers 2-5. This rotisserie is supposed to be placed in a space provided when one of slotted grates is removed from a barbecue unit. However, since this rotisserie is motor driven the motor 3 and any required wires, including the electrical wire or batteries required to power the rotisserie, would clearly not withstand the heat of a barbecue/grill and therefore would be destroyed most likely during a first use.

Accordingly, there is a need for a rotisserie that can be placed directly on a grill or over flames to rotate food items without being destroyed by the heat from the grill or flames.

There is also a need for a rotisserie that is completely portable, thus being able to be used during a camping trip where no electricity is available.

SUMMARY OF THE INVENTIVE CONCEPT

The present general inventive concept provides a portable rotisserie grill system configured to be placed on a hot grill or directly over flames to rotate different foods over the grill or flame.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a mobile grill rotisserie system, comprising: a roller assembly including a plurality of rollers disposed in parallel, each roller including a gear configured to rotate the corresponding roller; a welded metal shell including four sides, a bottom and a cover, the cover being connected to one of the four sides by at least two hinges, the welded metal shell including: a ceramic fiber insulation board disposed against each of the four sides and the bottom of the welded metal shell; a ceramic fiber blanket disposed adjacent to each of the ceramic fiber insulation boards; a battery compartment disposed within the ceramic fiber blankets; a warning siren configured to indicate when the internal portion of the metal shell has reached a predetermined temperature; and a rotation motor and corresponding motor heat sink disposed within the ceramic fiber blankets; and a motor coupler coupled to the rotation motor and to the gears of the roller assembly to rotate each of the plurality of rollers of the roller assembly when the rotation motor is activated.

In an example embodiment, the mobile grill rotisserie system further includes a motor heat sink and voltage cooling motor fan combination disposed within the ceramic fiber blankets; and an exhaust fan to cool internal components disposed within the ceramic fiber blankets.

In another example embodiment, the mobile grill rotisserie system further includes a digital temperature controller micro circuit board including: a micro switch chip disposed within the ceramic fiber blankets to activate the exhaust fan and the motor heat sink and voltage cooling motor fan combination when the internal portion of the metal shell has reached approximately 110° F.; and a temperature probe chip disposed within the ceramic fiber blankets to activate the warning siren when the internal portion of the metal shell reaches 175° F.

In another example embodiment, the internal components disposed within the ceramic fiber blankets includes the battery compartment, and the digital temperature controller micro circuit board.

In still another example embodiment, the mobile grill rotisserie system further includes a chain connected to each of the plurality of gears to cause each of the gears to rotate simultaneously In still another example embodiment, the mobile grill rotisserie system further includes a Bluetooth chip configured to control the revolutions per minute (RPM) of the rotation motor and to control the temperature settings of the micro switch chip and the temperature probe chip.

In still another example embodiment, the cover can include an on/off switch to turn on and off the rotation motor, the fans and the digital temperature controller micro circuit board; and a ventilation extending therethrough to enable hot air to escape from within the welded metal shell.

The foregoing and/or other features and utilities of the present general inventive concept may also be achieved by providing a portable grill rotisserie system, comprising: a roller assembly including a plurality of rollers disposed in parallel and rotatably connected to each other via a sprocket assembly; a metal box including a cover connected to the box via a hinge, the metal box including: ceramic fiber insulation boards disposed along all internal sides and the bottom thereof; a ceramic fiber blanket disposed adjacent to the internal sides of the ceramic fiber insulation boards; a battery compartment disposed within the metal box; a warning siren disposed on the cover to indicate when the internal portion of the metal box has reached a predetermined temperature; and a rotation motor and corresponding motor heat sink disposed within the metal box; and a motor coupler coupled to the rotation motor and to the sprocket assembly to rotate each of the plurality of rollers of the roller assembly when the rotation motor is activated.

In an example embodiment, the mobile grill rotisserie system further includes a cooling motor fan configured to cool the rotation motor; and an exhaust fan configured to cool components disposed within the metal box.

In another example embodiment, the mobile grill rotisserie system further includes a digital temperature controller micro circuit board including a micro switch chip to activate the cooling motor fan and the exhaust fan when the internal temperature of the metal box reaches 110° F.; and a temperature probe chip configured to activate the warning siren when the internal temperature of the metal box reaches 175° F.

In another example embodiment, the internal components of the metal box include the battery compartment and the digital temperature controller micro circuit board.

In another example embodiment, the cover can include: an on/off switch to turn on and off the rotation motor, the fans and the digital temperature controller micro circuit board; and a ventilation extending therethrough to enable hot air to escape from within the metal box.

The foregoing and/or other features and utilities of the present general inventive concept may also be achieved by providing a portable grill rotisserie system, comprising: a plurality of rollers connected to each other via a sprocket assembly; a metal box including a cover connected to the box via a hinge, the metal box including: ceramic insulation disposed along all internal walls thereof; a battery compartment disposed therein; a rotation motor disposed therein; and at least one heat exhaust fan disposed therein; and a motor coupler coupling the rotation motor to the sprocket assembly to rotate each of the plurality of rollers when the rotation motor is activated.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
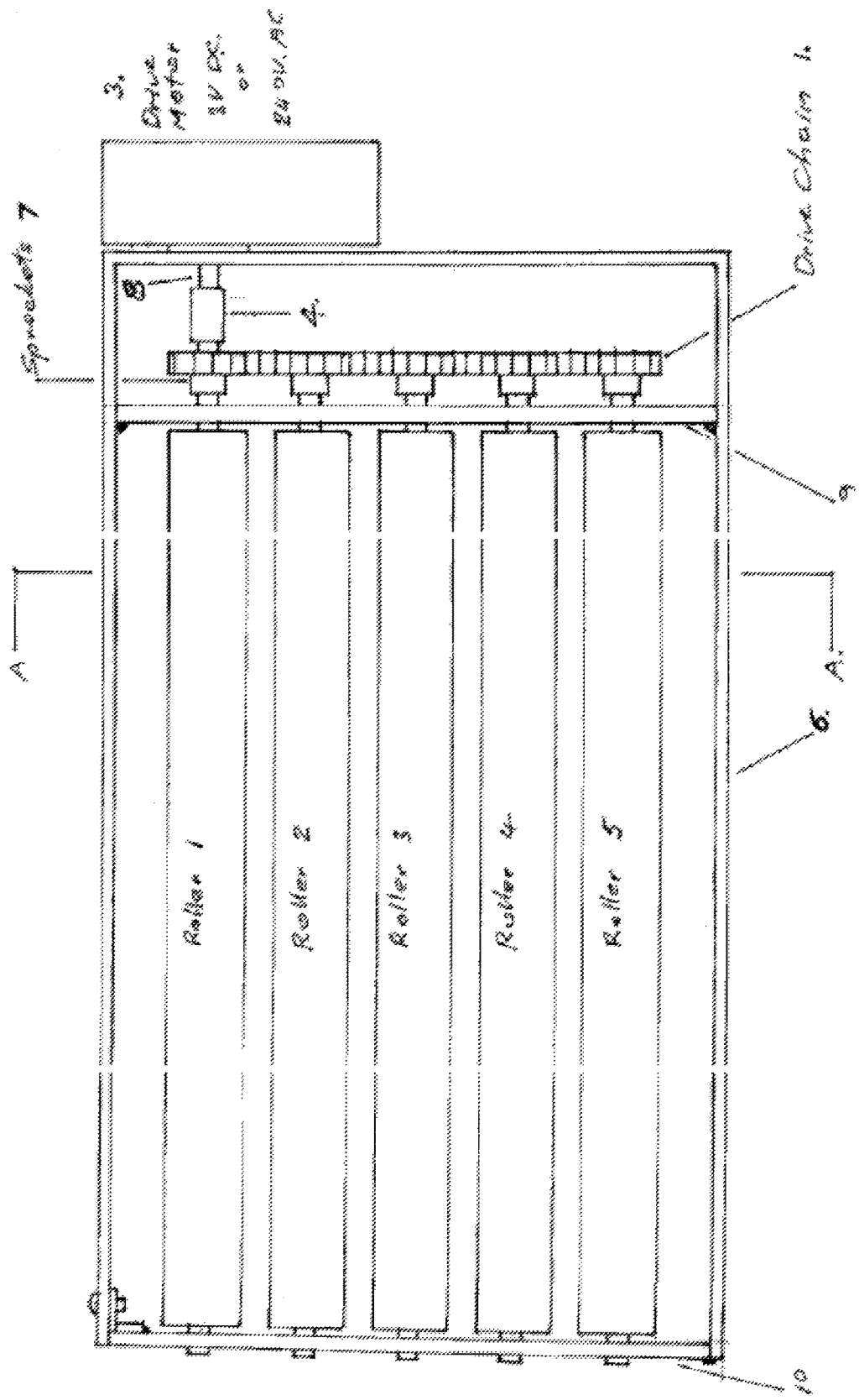
FIG. 1 illustrates a conventional sausage rotisserie.

The drawings illustrate a few example embodiments of the present inventive concept and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to the lexicographer of this document, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description provided throughout the specification.

Hereinafter, one or more exemplary embodiments of the present general inventive concept will be described in detail with reference to accompanying drawings.

Example embodiments of the present general inventive concept are directed to a portable rotisserie system configured to be placed directly on a grill or other flames for cooking food in an evenly distributed manner. This portable rotisserie system uses a circuit board, temperature probes, multiple layers of thermal insulation, dual exhaust fans for a battery and internal components to keep the portable rotisserie system cool internally. The portable rotisserie system also integrates with Bluetooth and a mobile app to control the revolutions per minute (RPM) of rollers and to change settings, and incorporates a temperature activated internal speaker to notify a user when the portable rotisserie system gets too hot internally, or to notify a user when a preprogrammed timer has completed by voicing the phrases: "Your Food is Complete," or "Batteries are low," or "Warning, system error." However, these notifications are not limiting in scope, and the portable rotisserie system can be configured to notify a user of other necessary issues regarding heat and cooking, without departing from the spirit and scope of the overall present inventive concept.

Figure 2:
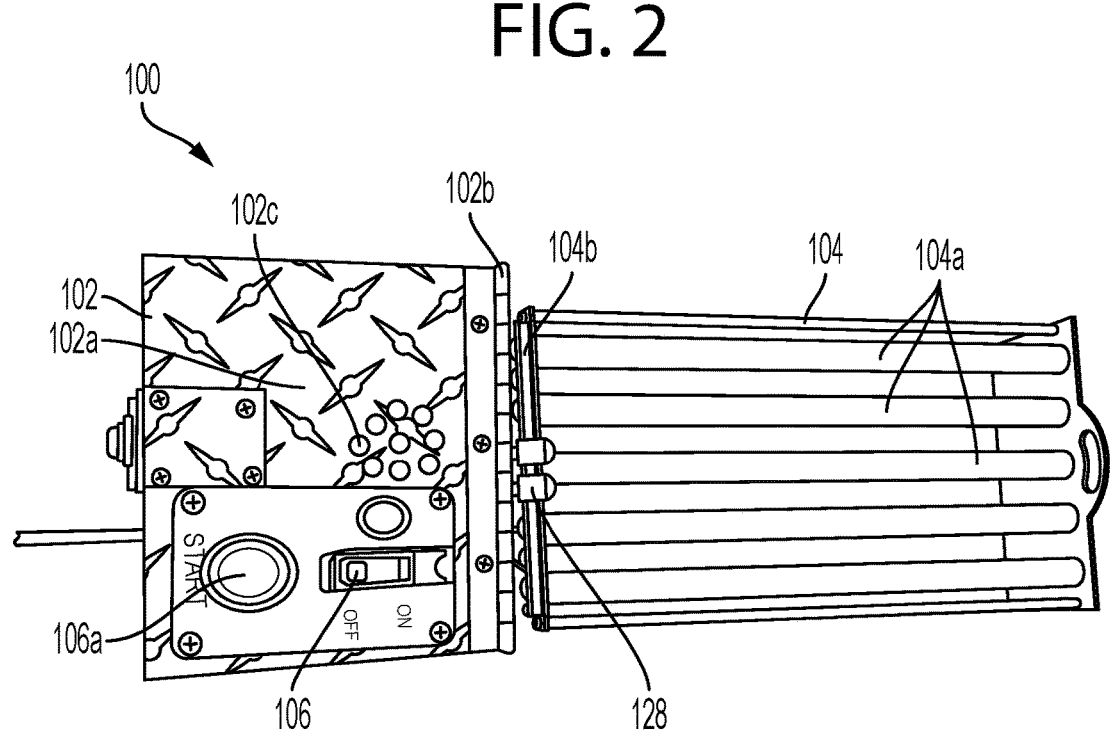
FIG. 2 illustrates a top view of a mobile grill rotisserie system, according to an example embodiment of the present inventive concept.
Figure 3:
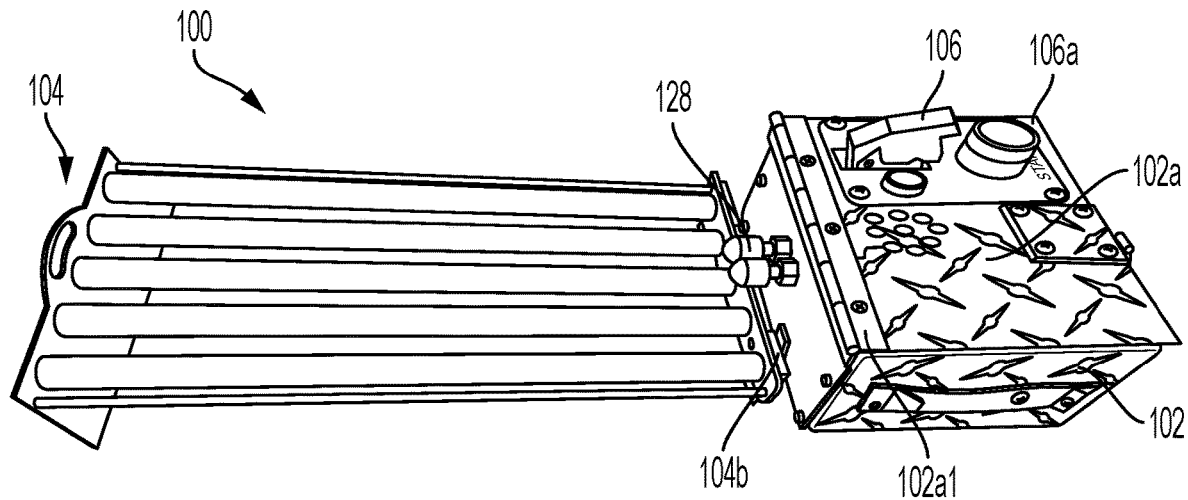
FIG. 3 illustrates a plan view of the mobile grill rotisserie system, according to the example embodiment of FIG. 2.

FIG. 2 illustrates a top view of a mobile grill rotisserie system 100 according to an example embodiment of the present inventive concept, and FIG. 3 illustrates a plan view of the mobile grill rotisserie 100 according to the example embodiment of FIG. 2. Referring to FIGS. 2 and 3, the mobile grill rotisserie system 100 can include a welded metal shell 102 made of stainless steel or other material(s) which can withstand high heat. The welded metal shell 102 can include a bottom, four sides and a cover 102a to form a square metal box 102. The cover 102a can open and close via at least one hinge 102a1 connected between the welded metal shell 102 and the cover 102a. The cover 102a can also include a ventilation 102c formed therethrough to allow hot air to escape from within the shell 102.

The welded metal shell 102 is attached to a roller assembly 104, which can include a plurality of individual rollers 104a. Preferably the plurality of rollers 104a are disposed in parallel and include a respective gear. The gears together can form a sprocket assembly 104b configured to rotate the gears simultaneously. The gears of the sprocket assembly can be rotated by a motor coupler 128 coupled to a rotation motor 114 within the welded metal shell 102 at one end thereof and connected to the sprocket assembly on a opposite end thereof, where the sprocket assembly 104b rotates the gears of the individual rollers 104a, as described in more detail below. The configuration of the metal shell 102 with respect to the roller assembly 104 is such that the roller assembly 104 can be placed directly over flames of a grill while the metal shell 102 can be situated adjacent to the grill, thus avoiding the flames. Disposed on the top of the welded metal shell 102 can be an on/off switch 106 having an on/off indicator light 106a. Alternatively, the rollers 104a of the roller assembly 104 can be rotated together via a mutually connected chain (not illustrated) connected to each gear of the rollers 104a. The motor coupler 128 is configured to couple to different types of roller assemblies, such as a hot dog roller assembly, a Kabob roller assembly, a bratwurst roller assembly, etc. It is to be noted that different types of roller assemblies 104 can be alternatively used as an alternative to the roller assembly 104 without departing from the spirit and scope of the overall present inventive concept.

Figure 4A:
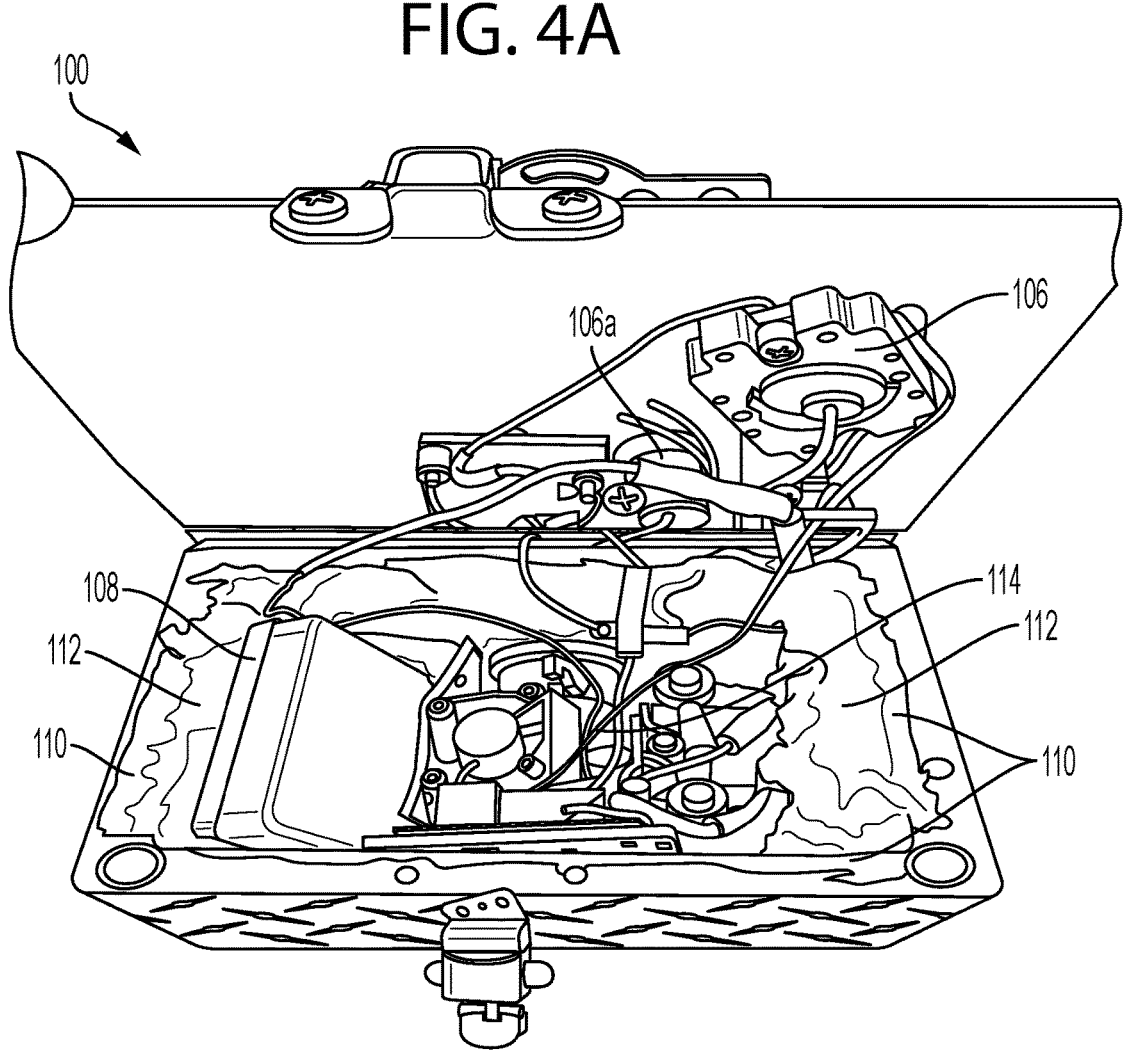
FIG. 4A illustrates an internal view of the mobile grill rotisserie system, according to the example embodiment of FIG. 2.

FIG. 4A illustrates an internal view of the mobile grill rotisserie system 100 according to the example embodiment of FIG. 2. Each of the four walls and bottom of the welded metal shell 102 can include a ceramic fiber insulation board 110 attached on inner sides thereof to provide insulation from external heat of a grill of flames. Adjacent each of the ceramic fiber insulation boards 110 can be disposed a ceramic fiber blanket 112 to provide additional insulation from external heat of a grill or flames. A battery compartment 108 to receive batteries therein can be disposed against or adjacent to one of the ceramic fiber insulation boards 110 and the ceramic fiber blanket 112 disposed against one of the walls of the welded metal shell 102, as illustrated in FIG. 4A. Batteries (such as, for example AA Lithium Iron Phosphate (LIFePo4) high temperature batteries, which have a heat tolerance greater than 500 degrees F.) within the battery compartment 108 are configured to apply power to each of the electronic devices within the portable rotisserie system 100, as is described in more detail below. The rotation motor 114 is disposed within the welded metal shell 102 and is connected to the motor coupler 128 to transfer rotational force to the sprocket assembly 104b to rotate each of the individual rollers 104a of the roller assembly 104. The welded metal shell 102 can also include a fire prevention battery bag 108a in which the battery compartment 108 can be disposed therein.

Figure 4B:
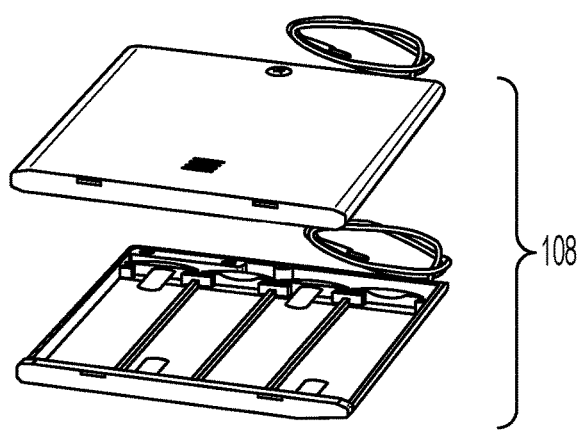
FIG. 4B illustrates an expanded view of a battery compartment disposed within the mobile grill rotisserie system, according to the example embodiment of FIGS. 2 and 4A.

FIG. 4B illustrates an expanded view of the battery compartment 108.

Figure 4C:
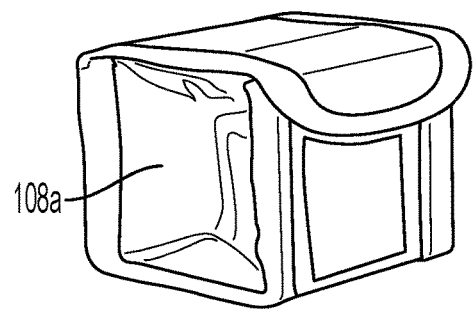
FIG. 4C illustrates a fire bag for the battery compartment disposed within the mobile grill rotisserie system, according to the example embodiment of FIGS. 2 and 4A-4B.

FIG. 4C illustrates an expanded view of a fire prevention battery bag 108a in which the battery compartment 108 can be stored in to protect the battery compartment 108 and batteries therein from excess heat.

Figure 4D:
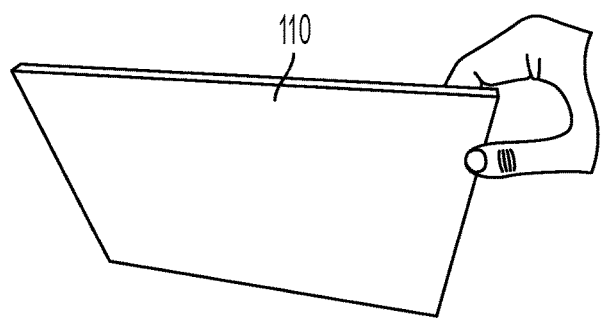
FIG. 4D illustrates a ceramic fire/heat insulation board disposed along walls within the mobile grill rotisserie system according to the example embodiment of FIGS. 2 and 4A.

FIG. 4D illustrates a plan view of one of the ceramic fiber insulation boards 110.

Figure 4E:
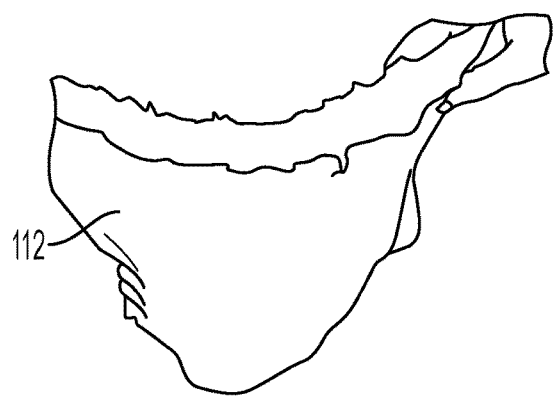
FIG. 4E illustrates a ceramic fiber blanket of the mobile grill rotisserie system according to the example embodiment of FIGS. 2 and 4A.

FIG. 4E illustrates an example of the ceramic fiber blanket 112 to be disposed against one of the walls of the welded metal shell 102.

Figure 4F:
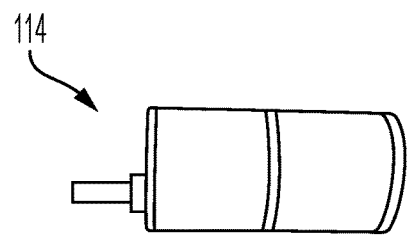
FIG. 4F illustrates a rotatable motor disposed within the mobile grill rotisserie system according to the example embodiment of FIGS. 2 and 4A.

FIG. 4F illustrates a side view of the rotational motor 114.

Figure 5A:
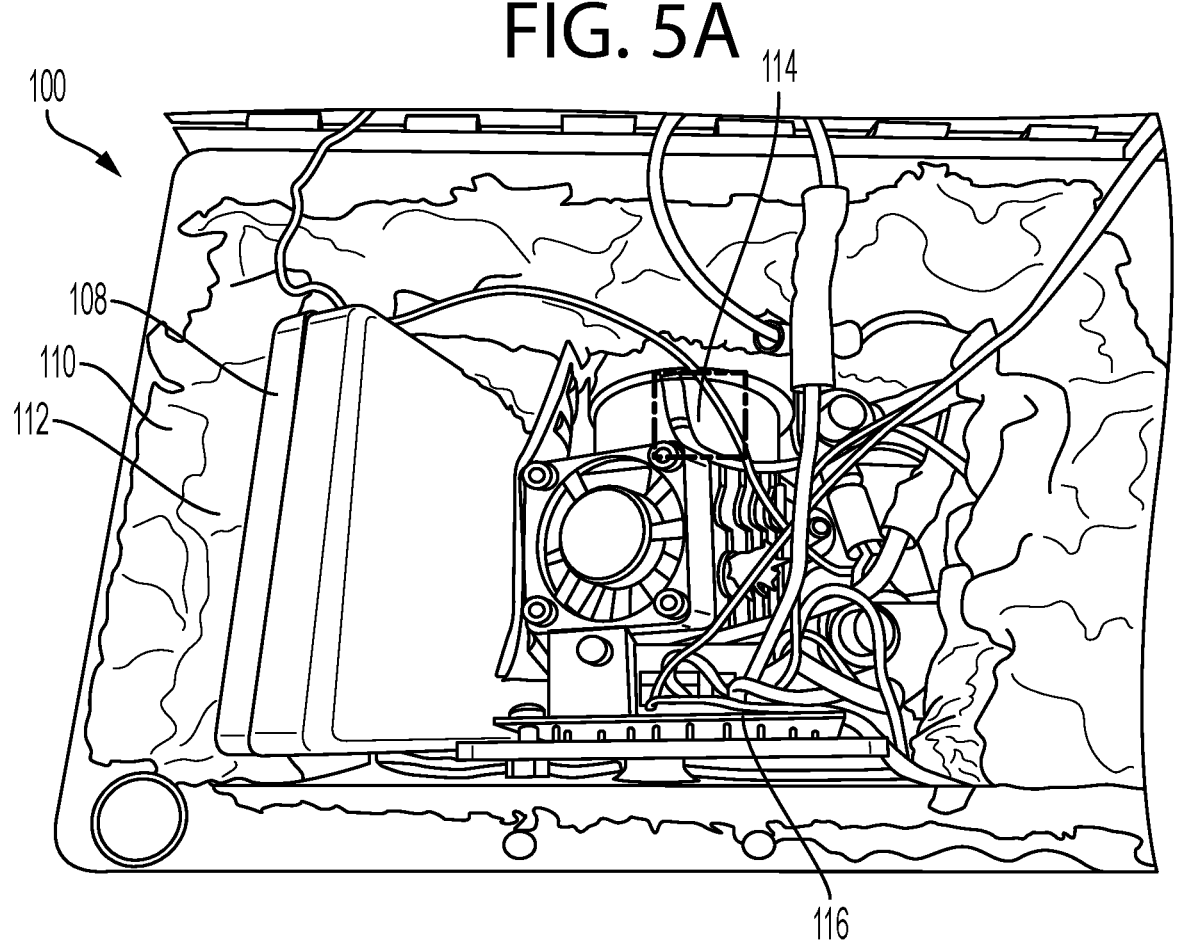
FIG. 5A illustrates another internal view of the mobile grill rotisserie system according to the example embodiment of FIG. 2.

FIG. 5A illustrates an expanded internal view of the mobile grill rotisserie system 100 according to the example embodiment of FIG. 2. As illustrated in FIG. 5A, the rotational motor 114 can be disposed adjacent to the battery case 108 and an axle of the rotational motor 114 can extend through a port (not illustrated) of the welded metal shell 102 to be connected to the motor coupler 128. Adjacent to another one of the walls of the welded metal shell 102 can be disposed a digital temperature controller micro circuit board 116.

Figure 5B:
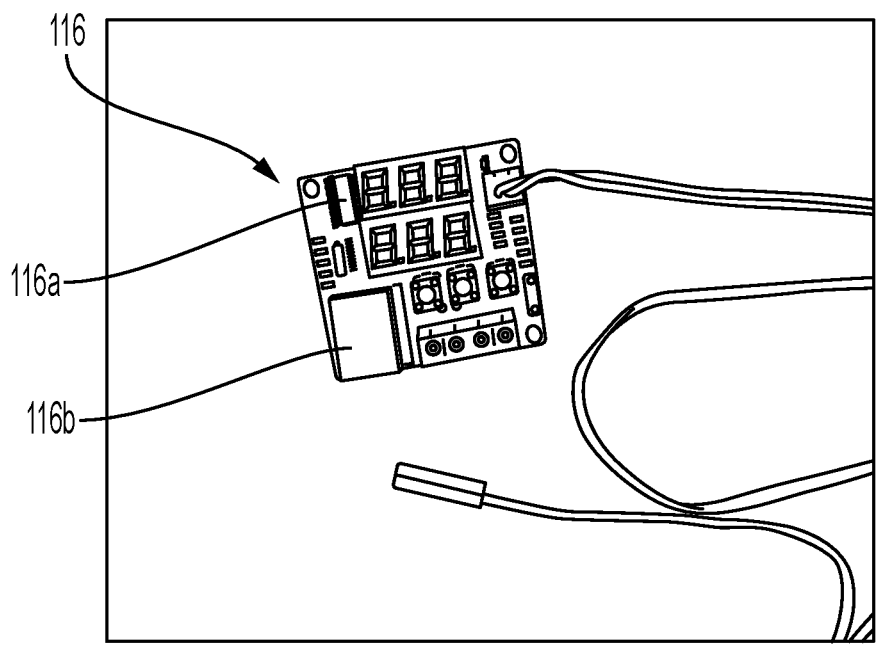
FIG. 5B illustrates a digital temperature controller micro circuit board disposed within the mobile grill rotisserie system according to the example embodiment of FIGS. 2 and 5A.

As illustrated in FIG. 5B, the digital temperature controller micro circuit board 116 can include a first "micro switch chip" 116a and a second "temperature probe chip" 116b. The first micro switch chip 116a can be configured to be set to 110 degrees F. such that when 110 degrees F. is reached within the welded metal shell 102 the chip 116a activates a 2×12 voltage temperature exhaust cooling fan 122 (see FIG. 7B) and a motor heat sink and voltage cooling motor fan combination 124 (see FIG. 7C). The second temperature probe chip 116b can be configured such that when 175 degrees F. is reached within the welded metal shell 102 the second temperature probe chip 116b can activate a warning siren indicating that the internal portion and/or components of the welded metal shell 102 have reached peak operating temperature. Both the chip 116a and the chip 116b can be adjusted to be set to any desired temperature for activation.

Figure 6A:
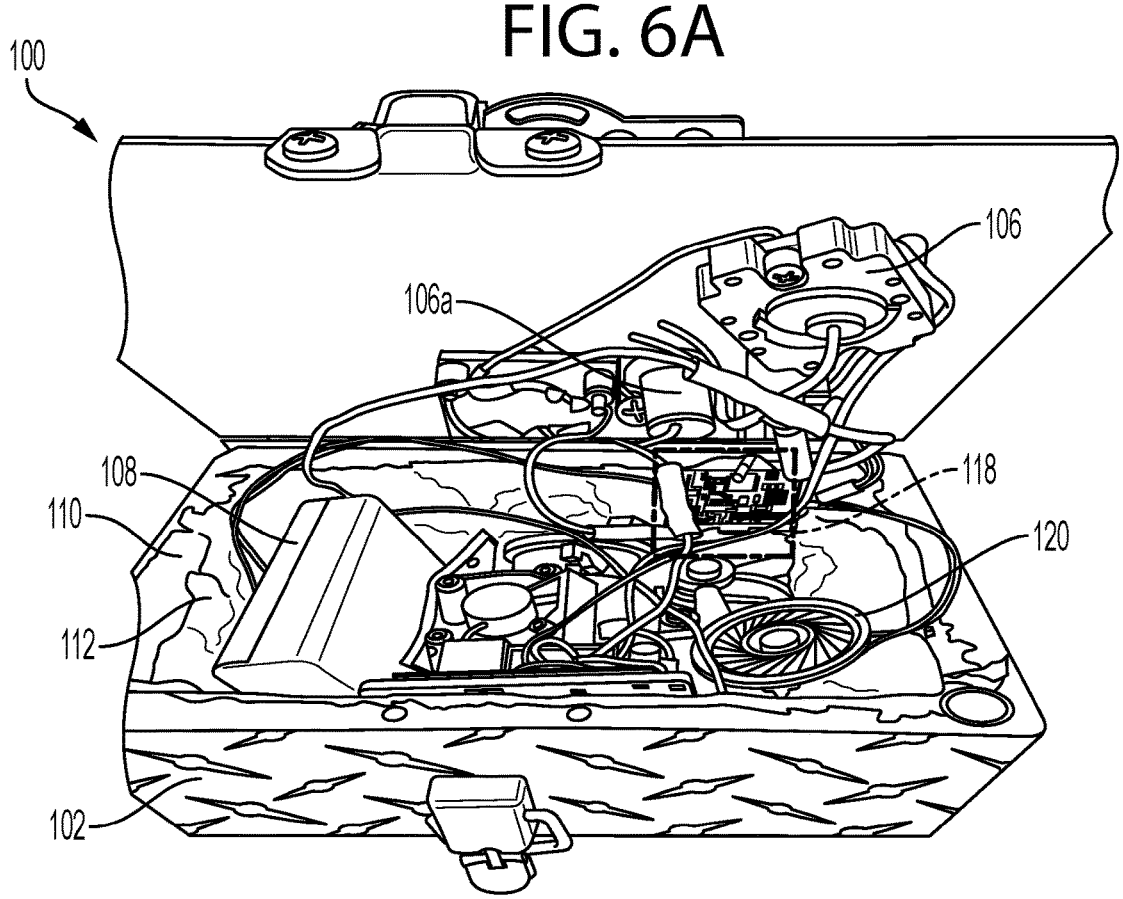
FIG. 6A illustrates another internal view of the mobile grill rotisserie system according to the example embodiment of FIG. 2.

FIG. 6A illustrates still another internal view of the mobile grill rotisserie system 100 according to the example embodiment of FIG. 2. As illustrated in FIG. 6A, the on/off power switch 106 and the power indicator light 106a can be attached to the top portion of the welded metal shell 102. Connected to another wall of the welded metal shell 102 can be a Bluetooth chip 118 to control revolutions-per-minute (RPMs) of the rotational motor 114, to control voice settings and to receive real time food product alerts while on grill. A sound card and speaker combination 120 can be connected to the Bluetooth chip 118 to provide the sound and alarms, as described above.

Figure 6B:
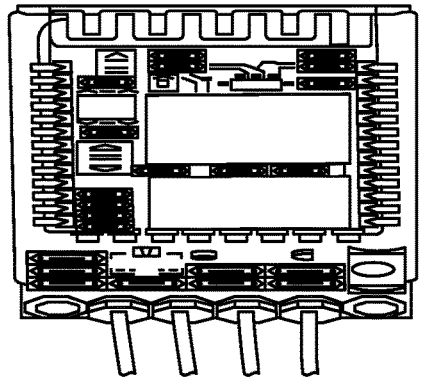
FIG. 6B illustrates a Bluetooth chip controller disposed within the mobile grill rotisserie system according to the example embodiment of FIGS. 2 and 6A.
Figure 6C:
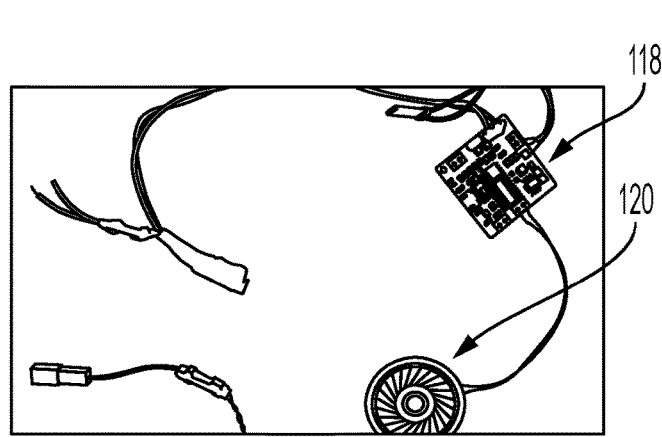
FIG. 6C illustrates a sound circuit card with a 12V to 5V step down circuit and speaker disposed within the mobile grill rotisserie system according to the example embodiment of FIGS. 2 and 6A.

FIG. 6B illustrates an expanded view of the Bluetooth chip 118 with sound card, and FIG. 6C illustrates a view of the Bluetooth chip 118 with sound card and speaker 120.

Figure 7A:
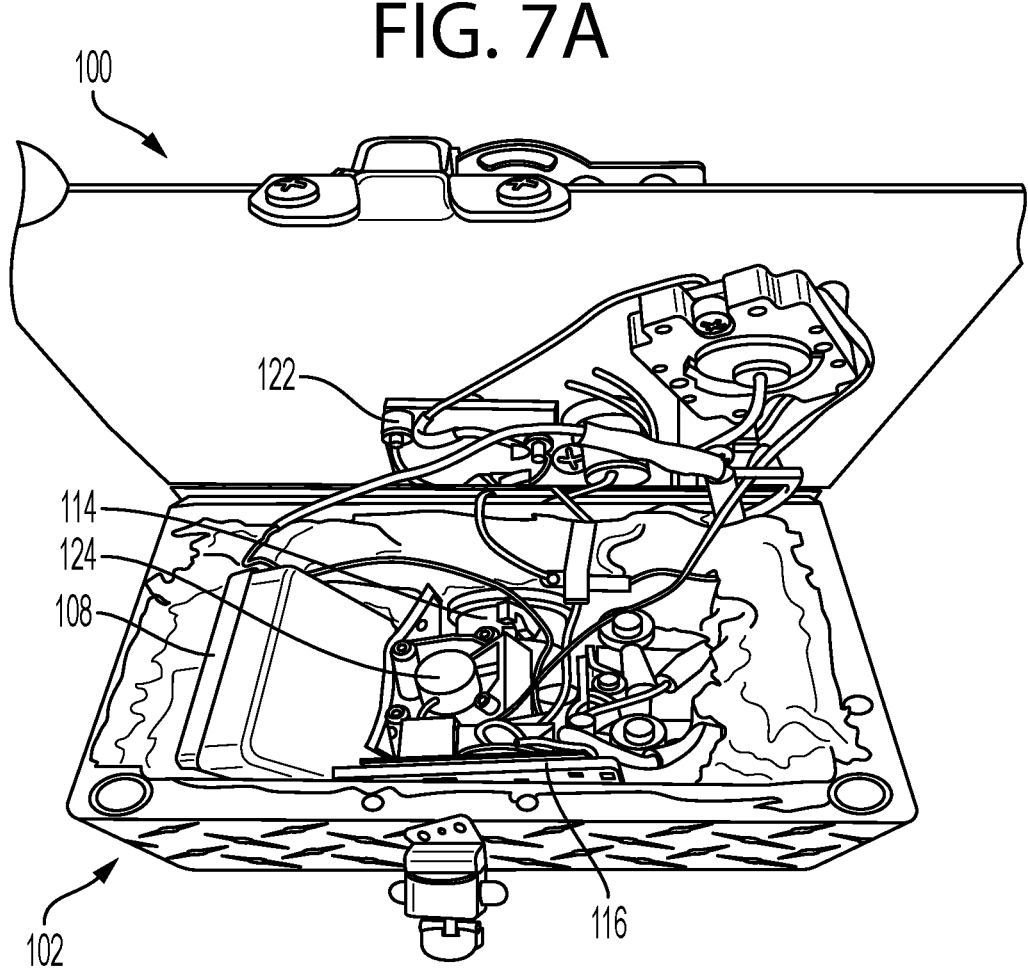
FIG. 7A illustrates another internal view of the mobile grill rotisserie system according to the example embodiment of FIG. 2.
Figure 7B:
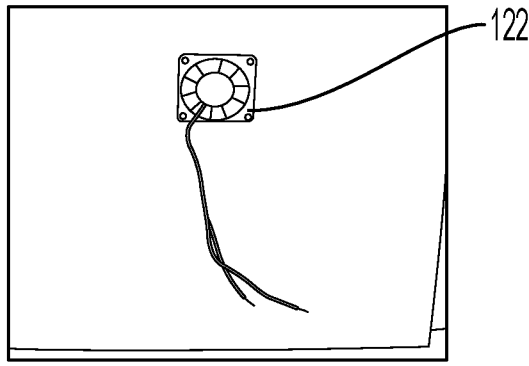
FIG. 7B illustrates a temperature activated exhaust fan disposed within the mobile grill rotisserie system according to the example embodiment of FIGS. 2 and 7A.
Figure 7C:
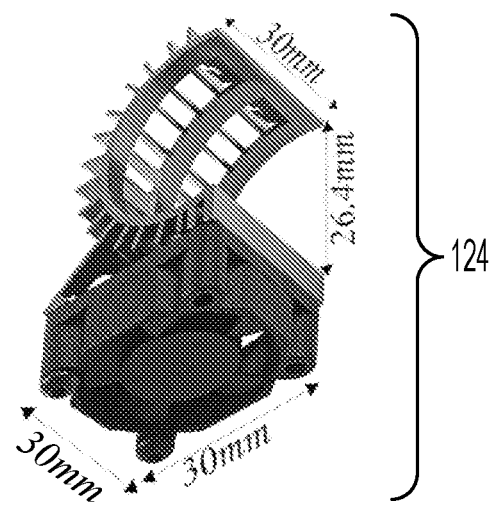
FIG. 7C illustrates a motor heat sink and cooling motor fan combination disposed within the mobile grill rotisserie according to the example embodiment of FIGS. 2 and 7A.

FIG. 7A illustrates still another internal view of the mobile grill rotisserie system 100 according to the example embodiment of FIG. 2. As illustrated in FIG. 7A, a 2×12 voltage temperature activated exhaust fan 122 can be attached to the top portion of the welded metal shell 102 to fan heat out of the welded metal shell 102, and a voltage cooling fan and heat sink combination 124 to cool the internal portion of the welded metal shell 102. FIG. 7A illustrates an expanded view of the 2×12 voltage temperature activated exhaust fan 122 and FIG. 7C illustrates an expanded view of the voltage cooling fan and heat sink combination 124.

Figure 7D:
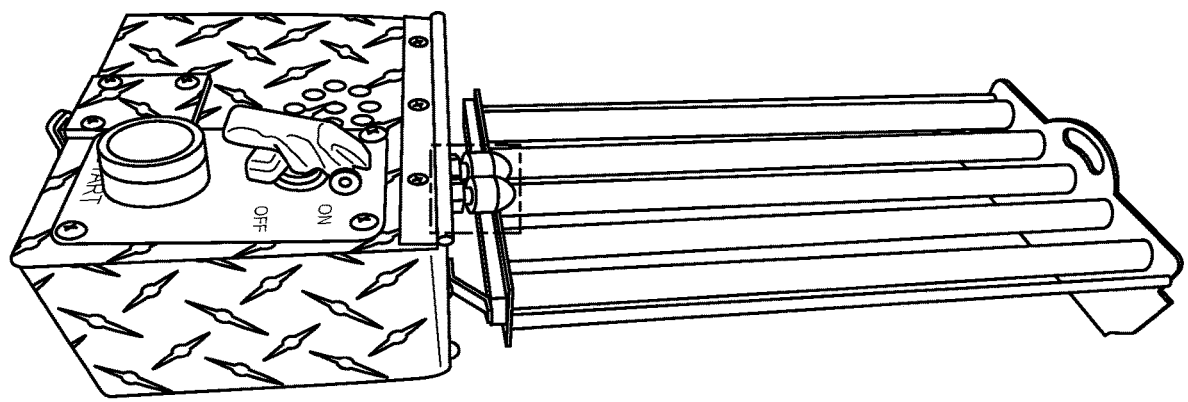
FIG. 7D illustrates placement of the motor coupler according to the example embodiment of FIG. 2.
Figure 7E:
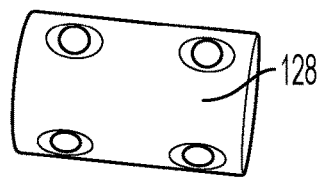
FIG. 7E illustrates an expanded view of the motor coupler according to the example embodiment of FIG. 2.

FIG. 7D illustrates placement of the motor coupler 128 coupled to the rotation motor 114 within the welded metal shell 102 at one end thereof and to a sprocket assembly connected to the individual rollers 104a of the roller assembly 104, and FIG. 7E illustrates an expanded view of the motor coupler 128. The motor coupler 128 is configured to be quickly detachable and can reattach to multiple sizes/variations of grill rollers 104a or other accessories in which the motor can turn. For example, the motor coupler 128 can be attached to a six roller 104a configuration to and eight or twelve roller 104a configuration with a simple detaching from one roller assembly 104 to another roller assembly.

Figure 8:
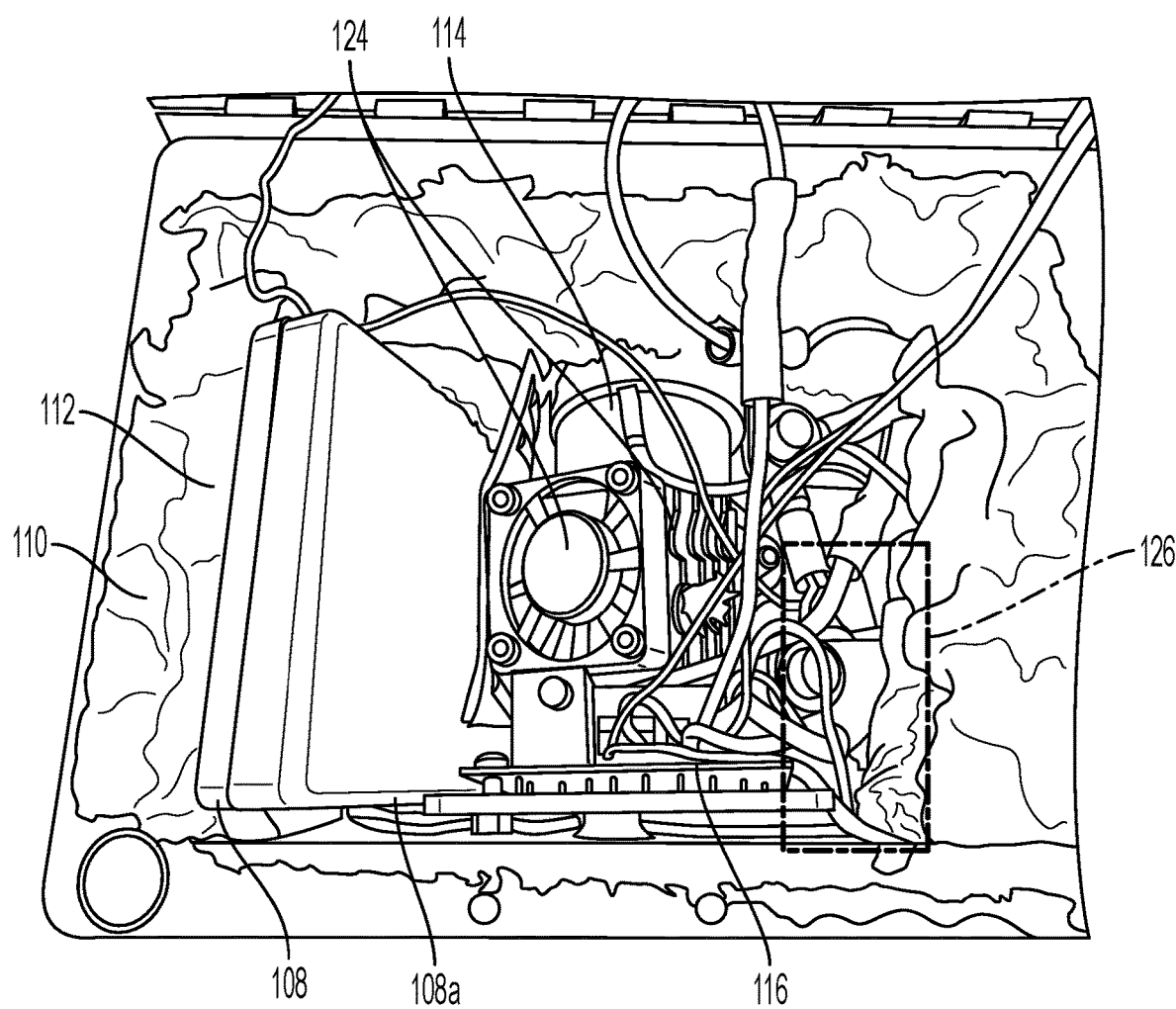
FIG. 8 illustrates an expanded internal view of the mobile grill rotisserie system according to the example embodiment of FIG. 2.

FIG. 8 illustrates an expanded internal view of the mobile grill rotisserie system 100 according to the example embodiment of FIG. 2. As illustrated in FIG. 8, a wire terminal 126 can be used to attach all of the wires of the electronic parts to a central wiring hub. Also illustrated is the battery compartment 108, battery fire insulation bag 108a, ceramic fiber insulation board 110, ceramic fiber blanket 112, rotation motor 114, digital temperature controller micro circuit board 116, voltage cooling motor fan with attached heat sink 124 and wire terminal 126.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A mobile grill rotisserie system, comprising:
    a roller assembly including a plurality of rollers disposed in parallel, each roller including a gear configured to rotate the corresponding roller;
    a welded metal shell including four sides, a bottom and a cover, the cover being connected to one of the four sides by at least two hinges, the welded metal shell including:
        a ceramic fiber insulation board disposed against each of the four sides and the bottom of the welded metal shell;
        a ceramic fiber blanket disposed adjacent to each of the ceramic fiber insulation boards;
        a battery compartment disposed within the ceramic fiber blankets;
        a warning siren configured to indicate when the internal portion of the metal shell has reached a predetermined temperature; and
        a rotation motor and corresponding motor heat sink disposed within the ceramic fiber blankets; and
    a motor coupler coupled to the rotation motor and to the gears of the roller assembly to rotate each of the plurality of rollers of the roller assembly when the rotation motor is activated.

2. The mobile grill rotisserie system according to claim 1, further comprising:
    a motor heat sink and voltage cooling motor fan combination disposed within the ceramic fiber blankets; and
    an exhaust fan to cool internal components disposed within the ceramic fiber blankets.

3. The mobile grill rotisserie system according to claim 2, further comprising:

a digital temperature controller micro circuit board including:
  a micro switch chip disposed within the ceramic fiber blankets to activate the exhaust fan and the motor heat sink and voltage cooling motor fan combination when the internal portion of the metal shell has reached approximately 110° F.; and
  a temperature probe chip disposed within the ceramic fiber blankets to activate the warning siren when the internal portion of the metal shell reaches 175° F.

4. The mobile grill rotisserie system according to claim 3, wherein the internal components disposed within the ceramic fiber blankets includes the battery compartment, and the digital temperature controller micro circuit board.

5. The mobile grill rotisserie system according to claim 3, further comprising a Bluetooth chip configured to control the revolutions per minute (RPM) of the rotation motor and to control the temperature settings of the micro switch chip and the temperature probe chip.

6. The mobile grill rotisserie system according to claim 3, wherein the cover can include:
  an on/off switch to turn on and off the rotation motor, the fans and the digital temperature controller micro circuit board; and
  a ventilation extending therethrough to enable hot air to escape from within the welded metal shell.

7. A portable grill rotisserie system, comprising:
  a roller assembly including a plurality of rollers disposed in parallel and rotatably connected to each other via a sprocket assembly;
  a metal box including a cover connected to the box via a hinge, the metal box including:
    ceramic fiber insulation boards disposed along all internal sides and the bottom thereof;
    a ceramic fiber blanket disposed adjacent to the internal sides of the ceramic fiber insulation boards;
    a battery compartment disposed within the metal box;
    a warning siren disposed on the cover to indicate when the internal portion of the metal box has reached a predetermined temperature; and
    a rotation motor and corresponding motor heat sink disposed within the metal box; and
  a motor coupler coupled to the rotation motor and to the sprocket assembly to rotate each of the plurality of rollers of the roller assembly when the rotation motor is activated.

8. The portable grill rotisserie system according to claim 7, further comprising:
  a cooling motor fan configured to cool the rotation motor; and
  an exhaust fan configured to cool components disposed within the metal box.

9. The portable grill rotisserie system according to claim 8, further comprising:
  a digital temperature controller micro circuit board including a micro switch chip to activate the cooling motor fan and the exhaust fan when the internal temperature of the metal box reaches 110° F.; and
  a temperature probe chip configured to activate the warning siren when the internal temperature of the metal box reaches 175° F.

10. The portable grill rotisserie system according to claim 8, wherein the internal components of the metal box include the battery compartment and the digital temperature controller micro circuit board.

11. The mobile grill rotisserie system according to claim 10, wherein the cover can include:
  an on/off switch to turn on and off the rotation motor, the fans and the digital temperature controller micro circuit board; and
  a ventilation extending therethrough to enable hot air to escape from within the metal box.

12. A portable grill rotisserie system, comprising:
  a plurality of rollers connected to each other via a sprocket assembly;
  a metal box including a cover connected to the box via a hinge, the metal box including:
    ceramic insulation disposed along all internal walls thereof;
    a battery compartment disposed therein;
    a rotation motor disposed therein; and
    at least one heat exhaust fan disposed therein; and
  a motor coupler coupling the rotation motor to the sprocket assembly to rotate each of the plurality of rollers when the rotation motor is activated.

13. The portable grill rotisserie system according to claim 12, further comprising a fire prevention battery bag in which the battery compartment is disposed therein.

14. The portable grill rotisserie system according to claim 12, wherein the ceramic insulation disposed along all internal walls includes two different types of ceramic insulation material disposed directly adjacent to each other.

* * * * *